June 15, 1965  S. McCLOUD  3,189,045
AUTOMATIC WELL HEAD FLOW CONTROL
Filed May 23, 1962  2 Sheets-Sheet 1

Simon McCloud
INVENTOR.

June 15, 1965
S. McCLOUD
3,189,045
AUTOMATIC WELL HEAD FLOW CONTROL
Filed May 23, 1962
2 Sheets-Sheet 2
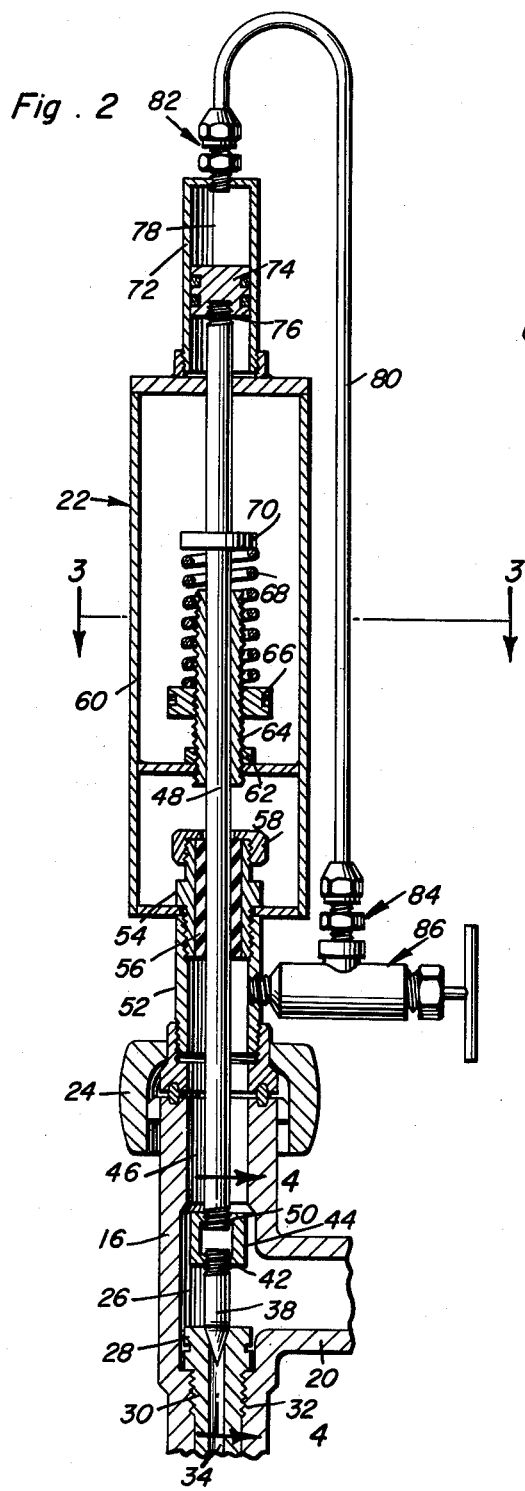
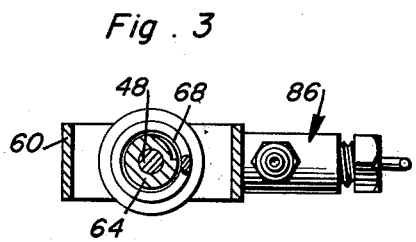
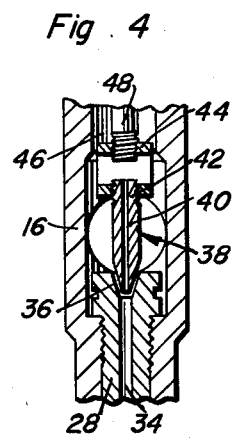
Simon Mc Cloud
INVENTOR.
BY *Clarence A. O'Brien*
*and Harvey B. Jacobson*
Attorneys 3,189,045
AUTOMATIC WELL HEAD FLOW CONTROL
Simon McCloud, Box 345, Lolita, Tex.
Filed May 23, 1962, Ser. No. 196,979
2 Claims. (Cl. 137—505.13)

This invention relates to a pressure control device adapted to maintain a relatively constant well head flowing pressure in order to control the flow of oil, gas, or other fluids from a well.

It is a primary object of the present invention to provide a pressure control device which is automatically operative to regulate the flow of fluid from a well head for the purpose of extending the flow of production capacity of the well.

In accordance with the foregoing object, the flow control device of the present invention is particularly adapted to eliminate fluid load up on oil or gas wells which tend to reduce the production capacity thereof and in some cases, completely stop production. The flow control device of the present invention nevertheless continuously maintains a positive choke or flow restriction on the discharge of the well head in order to control the flow therefrom. The flow restriction is however, automatically increased in size in response to a drop in the discharge pressure from the well head to thereby reduce the loading of the well and permit restoration of the regulated discharge pressure.

The flow control device of the present invention therefore operates as a back pressure regulator in connection with a well source pressure and also as a flowing bottom hole pressure regulator. The device may therefore be beneficial in controlling the percentages of water and gas-oil ratios because of its pressure stabilizing effect on the fluctuating fluid flow conditions of a well which are often unpredictable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a vertical longitudinal sectional view through the pressure control device illustrated in FIGURE 1.

FIGURE 3 is a transverse sectional view taken substantially through a plane indicated by section line 3—3 in FIGURE 2.

FIGURE 4 is a partial sectional view taken substantially through a plane indicated by section line 4—4 in FIGURE 2.

Figure 1:
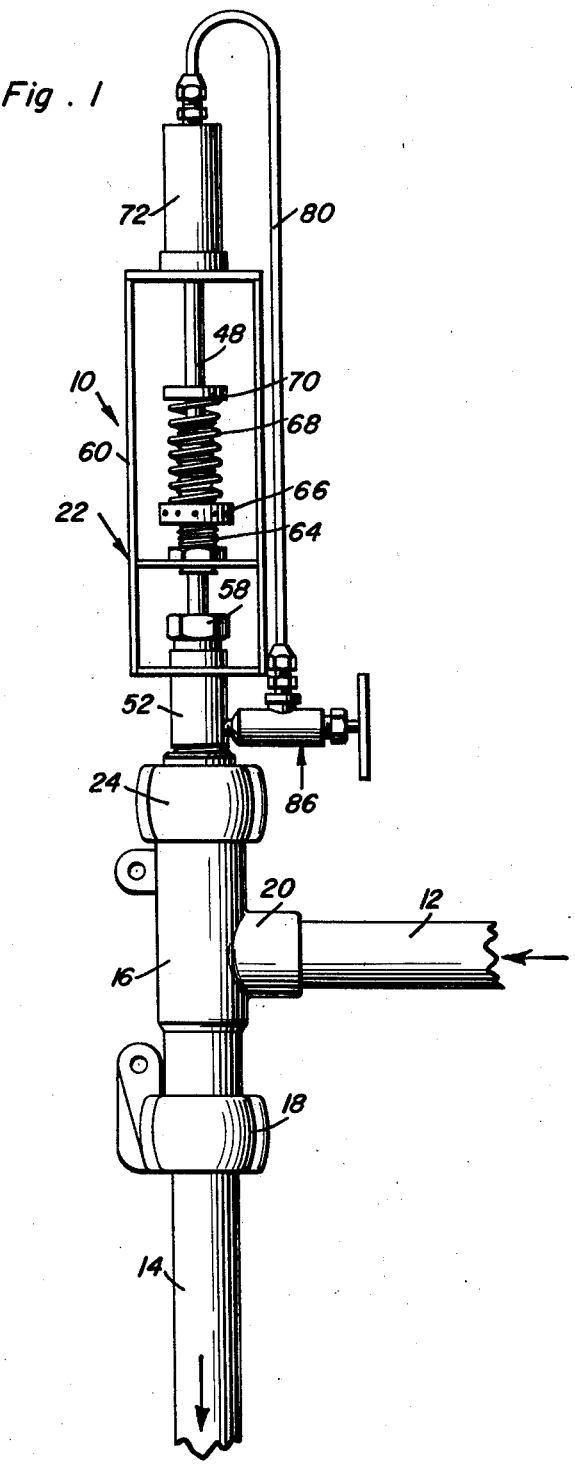
FIGURE 1 is a side elevational view of the pressure control device of the present invention mounted on the discharge pipe from a well head.

Referring now to the drawings in detail, it will be observed from FIGURE 1, that the flow control device generally referred to by reference numeral 10 is connected to the discharge pipe 12 of a well head so that fluid flowing therefrom will be conducted under controlled flow conditions in accordance with the principles of the present invention, to the outlet conduit 14. The flow control device 10 therefore includes a valve body 16 connected by a coupling device 18 to the outlet conduit 14, the valve body 16 including an inlet portion 20 which is connected to the discharge conduit 12 from the well head. A pressure controlling mechanism generally referred to by reference numeral 22 is connected to the valve body 16 by means of a second coupling device 24.

Figure 5:
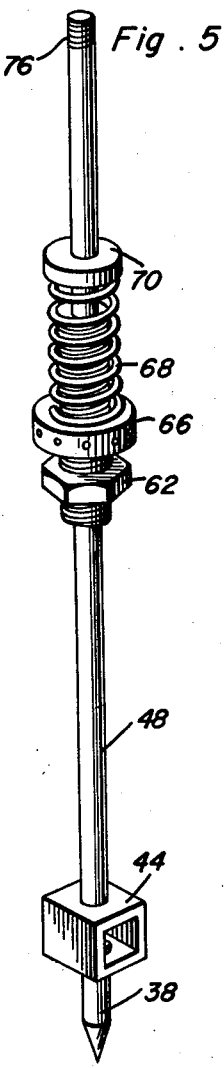
FIGURE 5 is a perspective view of a disassembled portion of the pressure control device.

Referring now to FIGURES 2, 4 and 5 in particular, it will be observed that the valve body includes an enlarged internal bore portion 26 which communicates with the well head discharge pipe 12 through the inlet portion 20. A fixed choke valve seat member 28 is mounted at the lower end of the bore portion 26 of the valve body by means of an externally threaded portion 30 threadedly engaged with the internally threaded bore portion 32 of the valve body. An outlet passage 34 is formed in the valve seat member 28 for conducting fluid to the outlet conduit 14. The upper end of the outlet passage 34 is connected to the conical valve seat passage 36 on which a ported valve stem element 38 is adapted to seat. The valve stem element 38 is provided with a restrictive passage 40 which communicates with the outlet passage 34 when the valve stem is seated in the valve seat member so as to conduct a restricted flow of fluid to the outlet conduit 14. The upper end portion 42 of the valve stem 38 is externally threaded for adjustable connection to a connecting yoke member 44 constituting a pressure signal delay means through which fluid may flow into the restricted passage 40 of the valve stem from the inlet 20. The connecting yoke member 44 does not offer any restriction to flow from the inlet 20 to the restricted passage 40 but does restrict fluid flow upwardly from the enlarged bore portion 26 of the valve body to the reduced diameter bore portion 46 when the valve stem 38 is in its unseated position as illustrated in FIGURE 4. The pressure signal in bore 46 will therefore lag any increase in inlet pressure in inlet 20 so as to delay loading of the well. Thus, a flow restricting valve assembly is formed wherein the ported valve element 38 seated on the choke valve seat member 28 will restrict flow of fluid to a predetermined flow rate which may be increased by unseating of the valve stem so as to reduce the amount of the flow restriction. The degree to which the valve stem 38 is unseated will depend upon the adjustable connection of the valve stem by means of the threaded portion 42 to the yoke member 44 as well as the adjustable connection of the yoke member to the valve actuating rod member 48 at its externally threaded lower portion 50. Movement of the valve actuating rod member 48 in an upward direction from the position illustrated in FIGURE 2 may therefore reduce the restriction to an adjustably desired degree with respect to the flow of fluid from the inlet 20 to the outlet conduit 14.

The valve actuator rod 48 is operated by the pressure control mechanism 22 and hence extends upwardly from the valve body 16 through a threaded fitting member 52 coupled by the coupling device 24 to the valve body 16. The fitting member 52 is also threadedly connected to a packing housing 54 carrying the packing 56 disposed about the valve actuator rod 48, the packing being held in assembled relation within the housing 54 by means of a packing nut 58. The packing housing 54 also is operative to fasten the fitting 52 and the valve body coupled thereto, to the frame assembly 60 of the pressure control mechanism 22. Mounted in the frame assembly 60 by means of a mounting jam nut 62, is an adjustment screw member 64 through which the valve actuator rod 48 extends. An internally threaded spring adjustment nut 66 is in threaded engagement with the adjusting screw member 64 in an axially adjusted position in order to control the compression of a spring element 68 which reacts between the adjustment nut 66 and spring abutment 70 which is fixed to the valve actuator rod 48. Accordingly, an adjustable spring bias is applied to the valve actuator rod 48 in order to provide a continuous unseating bias to the ported valve stem 38. The valve actuator rod 48 will therefore respond to a predetermined fluid pressure in order to seat the ported valve stem 38 for limiting the flow rate to a predetermined flow value.

In order to render the valve actuator rod 48 responsive to a predetermined discharge pressure of the fluid flow from the well head discharge conduit 12, a pressure cylinder 72 is mounted atop the frame assembly 60 for slidably receiving therewithin a grooved piston 74 connected to an upper threaded portion 76 of the valve actuator rod 48. The upper surface of the piston 74 will therefore be responsive to a fluid pressure producing a total force on the piston exceeding the spring force of the spring 68 in order to displace the valve actuator rod 48 downwardly to seat the ported valve stem 38. The fluid chamber 78 of the cylinder 72 is therefore supplied with fluid under pressure by means of the tubing 80 which is interconnected by means of the fitting assemblies 82 and 84 between the cylinder 72 and an adjustably controllable needle valve assembly 86. The needle valve assembly 86 is therefore threadedly connected to the fitting 52 providing fluid communication between the adjustable valve assembly 86 and the inlet 20 through the reduced diameter bore portion 46 of the valve body 16. It will therefore be apparent, that when the ported valve stem 38 is in its seated position as illustrated in FIGURE 2, unrestricted fluid communication between the inlet 20 and the valve assembly 86 exists whereas when the ported valve stem is in its unseated position as illustrated in FIGURE 4, restricted fluid communication exists. As a result thereof, there will be a greater delayed response to a rise in the discharge pressure from the discharge conduit 12 before the piston 74 will be operative to downwardly displace the valve actuator rod 48 in order to reduce fluid flow to a predetermined restricted flow rate upon development of a predetermined discharge pressure from the well. The delay rate may be selectively varied in both pressure changing directions by adjustable control of the needle valve assemblies 86 as desired. It will also be apparent that the delay rate will automatically vary as a function of piston displacement since the position of signal delay member 44 controls the passage restriction between the inlet 20 and bore 46. As a result thereof, the discharge pressure is stabilized without any severe fluctuations.

From the foregoing description, operation of the pressure control valve will be apparent. The spring compression of the spring element 68 may therefore be adjusted so that the valve stem 38 will be seated in delayed response to a predetermined discharge pressure. Accordingly, continuous flow of fluid from the discharge conduit 12 will load the tubing 80 with fluid and when the predetermined discharge pressure develops, because of the restricted flow loading the well discharge, the valve stem 38 will be seated to then limit the fluid flow to a predetermined low rate. Should the well head pressure drop, the spring force of the spring element 68 will overcome the lower pressure acting on the piston area so as to unseat the ported valve stem from its seat in the positive choke valve seat member 28. The fluid will then flow through a larger choke at a higher rate so as to unload the fluid build-up of the tubing 80. The well head pressure will then be permitted to increase in view of the reduced loading thereon. As the well discharge pressure increases, in a sustained manner, a delayed pressure signal will be transmitted through the needle valve assembly 86 to the piston 74 to once again seat the ported valve stem 38 in order to once again restrict flow so as to stabilize the well head discharge pressure at the aforementioned predetermined pressure value. The action of the pressure control device will thereby be operative to prolong the flowing life or production capacity of the well with which it is associated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A flow control device for use with a fluctuating pressure source of fluid comprising, a body having an inlet passage connected to said source and an outlet passage having an inner seating end, a choke element positioned in the body for movement into and out of engagement wtih said inner seating end of the outlet passage for regulating fluid flow from the inlet passage through said outlet passage, pressure responsive means actuatable for movement of said choke element, adjustable valve means establishing restricted fluid communication between the inlet pasage and the pressure responsive means for actuation thereof in delayed response to development of a pressure condition in said source, and pressure signal delay means responsive to positioning of the choke element for further delaying movement of the choke element only in response to an increase in pressure of said source when the choke element is out of engagement with the inner seating end of the outlet passage, whereby the flow of fluid from the source is varied to stabilize the pressure condition thereof, said pressure signal delay means comprising a yoke member interconnecting said choke element with the pressure responsive means, a connecting passage formed in the body establishing fluid communication between the inlet passage and the adjustable valve means, said yoke member moving into said connecting passage to reduce the flow area thereof when the choke element is out of engagement with the inner seating end of the outlet passage.

2. In a flow control device, pressure responsive means for varying the flow rate of fluid in accordance with fluctuations in fluid inlet pressure to stabilize said inlet pressure, a body having a fluid chamber portion, an inlet connected to said body for supply of fluid under inlet pressure to said chamber portion, an outlet connected to said body having an inner seating portion, a flow restricting element disposed in said chamber portion and movable into and out of engagement with said seating portion for varying the flow rate of fluid from the chamber portion into the outlet, a closed connecting passage formed in said body in fluid communication with said chamber portion for conducting a pressure signal reflecting variations in the inlet pressure, an actuating rod slidably mounted by the body and extending through said connecting passage for connection to said pressure responsive means and a yoke member adjustably connecting the actuating rod to the flow restricting element for movement thereof, said yoke member having a portion movable into the connecting passage to reduce the flow area thereof when the flow restricting element is moved out of engagement with the seating portion by the actuating rod.

References Cited by the Examiner

UNITED STATES PATENTS

| 2,302,284 | 11/42 | Abbott | 137—505.34 XR |
| 2,950,730 | 8/60 | Svensson | 137—116.3 |
| 2,955,614 | 10/60 | Maynig | 137—505.13 |

ISADOR WEIL, *Primary Examiner.*